March 21, 1950 L. B. GREEN 2,500,986
JUICE EXTRACTOR WITH A VIBRATORY PLUNGER
Filed April 28, 1945
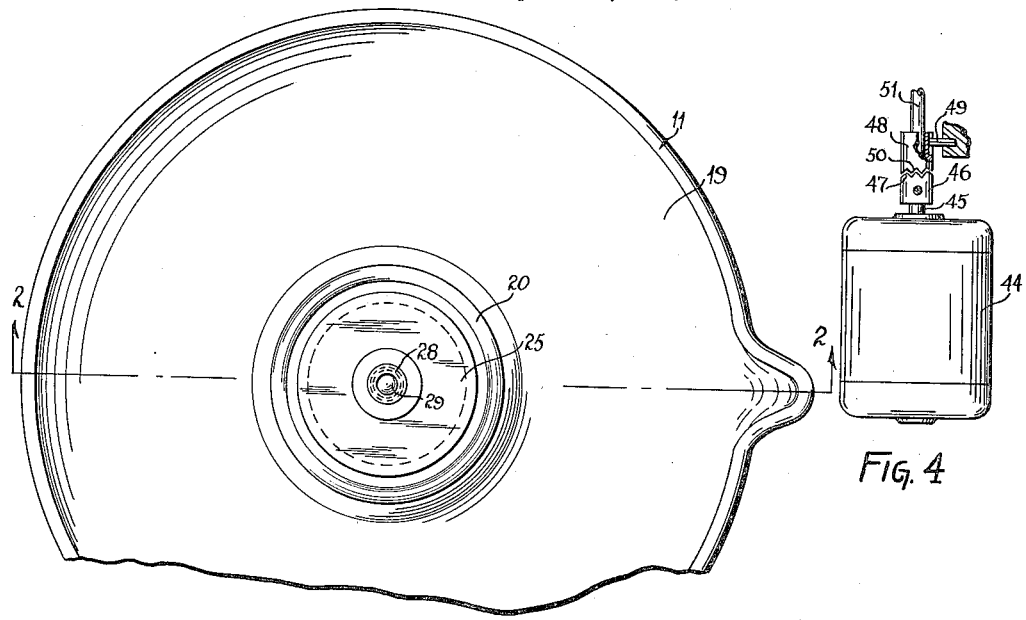
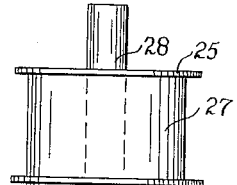
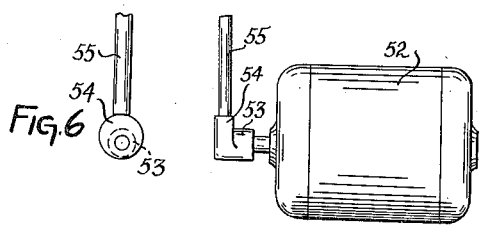
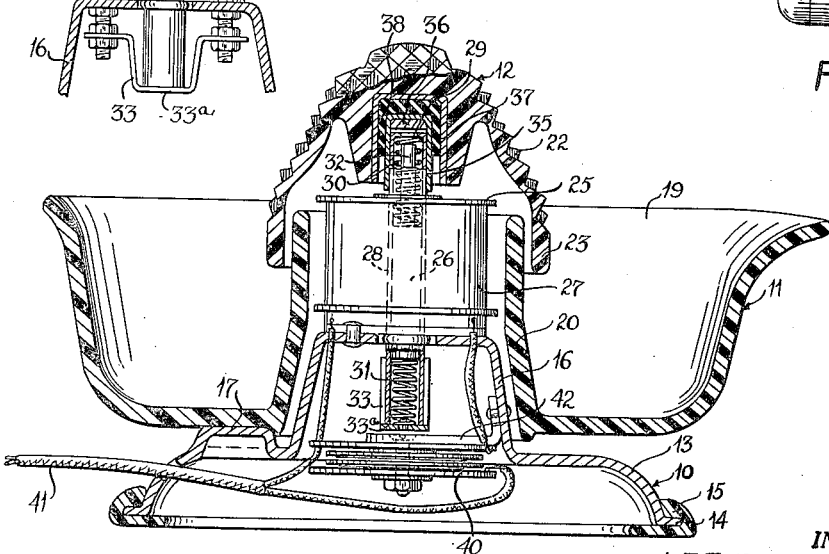
INVENTOR.
LEE B. GREEN
BY
Kurs Hudson Boughton & Williams
ATTORNEYS Patented Mar. 21, 1950

2,500,986

UNITED STATES PATENT OFFICE 2,500,986

JUICE EXTRACTOR WITH A VIBRATORY PLUNGER

Lee B. Green, Lakewood, Ohio

Application April 28, 1945, Serial No. 590,771

2 Claims. (Cl. 146—3)

This invention relates to the extraction of juice from citrous fruit and various other fruit bodies and aims to provide an improved device for this purpose which is power actuated but which is much simpler and of a more economical construction than the power actuated devices heretofore provided for this purpose.

Another object of the present invention is to provide novel apparatus for the extraction of juice from citrous fruit or the like, in which a penetrator is moved relatively into a fruit body by the application of pressure and a rapid vibratory movement is simultaneously imparted to the penetrator.

A further object of this invention is to provide improved juice extracting apparatus of this character, embodying novel mounting and actuating means for the vibratory penetrator.

Still another object of the invention is to provide an improved juice extracting device of this kind having a penetrator mounted for vibratory movement and against which a fruit body is adapted to be pressed, and wherein electrically actuated means imparts the vibratory movement to the penetrator.

The invention can be further briefly summarized as consisting in certain novel combinations and arrangements of parts hereinafter described and particularly set out in the appended claims.

In the accompanying sheet of drawings

Fig. 1 is a partial plan view of a juice extracting device embodying the present invention, the device being shown with the penetrator removed therefrom.

Fig. 2 is a vertical sectional view taken through the device on line 2—2 of Fig. 1.

Fig. 3 is a partial vertical sectional view taken at right angles to that of Fig. 2 and further illustrating the construction of the device.

Fig. 4 is a partial elevational view, somewhat diagrammatic in nature and showing another form of vibrating means for the penetrator, and Figs. 5 and 6 are similarly partial elevational views showing still another form of vibrating means for the penetrator.

Proceeding now with a more detailed description of the form of the invention illustrated in Figs. 1 to 3 inclusive, the device here shown comprises in general a hollow base 10, an annular receptacle 11 for the juice and a vibratory penetrator 12 for engagement with a fruit body from which the juice is to be extracted.

The hollow base 10 may be constructed from sheet metal or other suitable material and is here shown as having an upwardly dished portion 13 provided with a marginal flange or rim 14 adapted to rest or stand on a table or other supporting surface. A buffer ring 15 formed of soft rubber or other suitable material may be mounted on the rim 14 to prevent scratching or marring of the supporting surface. The base 10 is provided substantially centrally thereof with an upstanding tapered hollow boss 16 on which is mounted the means for supporting and vibrating the penetrator 12 as will be hereinafter explained. At spaced points around the upstanding boss 16 the upwardly dished portion 13 is provided with projections or rests 17 for supporting the receptacle 11.

As shown in the drawing the receptacle 11 may be in the form of a dish formed of plastic, glass or other suitable material and having an annular recess or chamber 19 therein for collecting and retaining the extracted juice. The annular recess 19 is defined in part by a central hollow sleeve portion 20 which is of approximately the depth of the recess and which surrounds the upstanding hollow boss 16 of the base 10 when the receptacle is supported on the projections 17 of the latter. The receptacle 11 can be readily lifted off the base 10 for purposes of washing or for pouring the juice out of the recess 19.

The penetrator or reamer 12 may be of any suitable size or shape which will enable this member to cooperate in a satisfactory manner with a fruit body for the purpose of extracting the juice from the latter. As here shown the extractor is in the form of a tapered convex body formed of plastic, glass or other suitable material and whose outer surface is preferably roughened by being provided with numerous pointed projections 22 in the form of teeth or ribs. The penetrator 12 is preferably of a tapered form so that it will more readily enter a fruit body when pressure is applied therebetween as by pressing the fruit against the penetrator. As shown in Fig. 2, the penetrator preferably also includes an annular skirt portion 23 which extends downwardly in telescoping relation around the hollow sleeve portion 20 of the receptacle 11 for directing the extracted juice into the annular recess 19.

The means for mounting and vibrating the penetrator 12 will be described next. The vibrating means is shown in Fig. 2 as comprising an electromagnet 25 mounted on the upper end of the hollow boss 16 and a vibratory plunger 26 disposed in the magnet and extending thereabove. The magnet 25 is provided with an energizing winding 27 which is disposed around an upright sleeve 28 formed of brass or other suitable non-magnetic material. The sleeve 28 is of a length to extend for some distance above and below the magnet 25 and the upper end of the sleeve has an opening 29 therein.

The plunger 26 is formed of soft iron or other magnetic material and is reciprocably movable in the sleeve 28. When the plunger 26 is at rest, such as when the electromagnet 25 is deenergized, it occupies substantially the position shown in Fig. 2 in which it is held by a pair of coiled springs 30 and 31 located in the sleeve 28. The upper end of the plunger 26 is provided with a relatively reduced stem portion 32 extending axially within the spring 30 and which is of a size such that it can be projected through the opening 29 of the sleeve 28. The sleeve 28 can be supported by being connected either with the magnet 25 or the boss 16, or preferably as shown in Fig. 3, by means of a bracket or stirrup 33 suspended from the top wall of the boss and having a transverse portion 33a extending across the lower end of the sleeve. The bracket 33 also forms a stop against which the lower end of the spring 31 seats.

The penetrator 12 is supported on the upper end of the sleeve 28 preferably by being provided with a cup element 35 which telescopes around the sleeve and has a sliding fit thereon which will permit the penetrator to have the above-mentioned vibratory movement and will also permit the penetrator to be readily removed from the sleeve when this is desired for washing or other purposes. An impact element or bumper 36 is located in the cup element 35 so as to be disposed immediately above the upper end of the sleeve 28 and is adapted to receive the impacts of the stem portion 32 of the plunger 26 when the latter is reciprocated or vibrated in the sleeve. These impacts imparted in rapid succession to the bumper 36 by the stem of the plunger 26, cause a rapid short-stroke rectilinear vibratory movement to be imparted to the penetrator 12 and this vibratory movement cooperates with the pressure being applied between the fruit body and the penetrator for causing the latter to readily enter the fruit body and squeeze the juice therefrom.

The penetrator 12 can be mounted solidly on the cup element 35 but preferably and as here shown a resilient mounting is provided. This can be obtained by providing the penetrator 12 with a second cup element 37 which is molded or otherwise secured therein and which is of a larger cross-sectional area than the cup element 35. A resilient body or packing 38, formed of soft rubber or other yieldable material, is disposed between the cup elements 35 and 37 so as to prevent a metal-to-metal contact between these elements and permit relative rocking therebetween. The resilient packing 38 is preferably bonded or cemented to the cup elements 37 and 35 so that the latter cup element will remain connected with the penetrator so as to facilitate the mounting of the penetrator on the sleeve 28 or its removal therefrom.

The desired reciprocating vibratory movement of the plunger 26 is obtained by energizing the coil 27 of the electromagnet 25 continuously with alternating current, or preferably, by energizing this coil intermittently with either alternating or direct current. The intermittent energization of the coil 27 is obtained by providing an automatic switch device 40 in the energizing circuit of the magnet. The switch 40 is of a known construction and may be a thermally responsive switch of a bi-metallic type which causes repeated rapid opening and closing of the circuit when current is supplied to the magnet by the conductor cord 41. The switch 40 may be conveniently located in the hollow base 10 and supported by a suitable bracket 42 as shown in Fig. 2.

In Fig. 4 of the drawing I show another form of vibrating means for the penetrator. This modified form of vibrating means comprises an electric motor 44 having a rotating shaft 45 on which is pinned or otherwise secured a sleeve or head 46 having an annular series of teeth or serrations 47 thereon. The rotatable head 46 cooperates with a similar head 48 which is axially shiftable but is held against rotation as by means of the pin 49. The non-rotatable head 48 has an annular series of teeth or serrations 50 which extend into meshing relation with the serrations 47. When the motor 44 is energized the head 46 is rotated, thereby causing the serrations 47 to produce a rapid reciprocating vibratory movement to the non-rotatable head 48. A stem or plunger 51 extending axially from the head 48 transmits the reciprocating vibratory movements to a penetrator (not shown) which can be supported in the same manner as the penetrator 12 of Fig. 2.

Fig. 6 shows another modified form of vibratory means in which an electric motor 52 drives a rotary cam 53 having an eccentric or lift portion 54 cooperating with a stem or plunger 55. When the motor 52 is energized it rotates the cam 53 and the resulting rapid reciprocating vibratory movement imparted to the stem or plunger 55 is transmitted by the latter to the penetrator (not shown) which can also be supported in the same manner as the penetrator 12 of Fig. 2.

From the foregoing description and the accompanying drawing it will now be readily understood that the present invention provides a juice extracting device in which the pressure applied between a penetrator and a fruit body is accompanied by a rapid vibratory movement of the penetrator imparted thereto by an electric power device. It will also be readily understood that the improved juice extracting device of this invention is of a very simple and inexpensive construction which is safe and easy to operate. Although it has been stated above that the receptacle can be lifted from the base for pouring the extracted juice from the receptacle, it will be understood also that since the device is of a very compact and light weight construction, it can be bodily lifted and tilted for pouring the extracted juice from the receptacle if this should be found desirable.

While I have illustrated and described my improved juice extracting device in considerable detail, it will be understood of course that I do not wish to be correspondingly limited in scope but regard my invention as including all changes and modifications coming within the scope of the appended claims.

Having thus described my invention, I claim:

1. In a juice extracting device of the character described, and upright sleeve, a penetrator adapted to enter a fruit body, means mounting said penetrator on said sleeve for vibratory short-stroke rectilinear movement comprising a hollow element telescopically engaging said sleeve and slidable thereon and a body of resilient rubber between said hollow element and penetrator, a plunger reciprocable in said sleeve for producing said vibratory movement, and means for causing a rapid reciprocation of said plunger.

2. In a juice extracting device of the character described, a base, an electromagnet supported by said base, a juice receptacle supported by said base and surrounding said electromagnet, an upright sleeve in said electromagnet and extending thereabove, spring means in said sleeve, a plunger in said sleeve engaging said spring means and adapted to be reciprocably vibrated by said electromagnet, an axially tapered penetrator engageable with a fruit body, and means mounting said penetrator on said sleeve so as to permit a rapid axial short-stroke rectilinear vibration of the penetrator by said plunger.

LEE B. GREEN.

REFERENCES CITED

The following references are of record in the file of this patent:

UNITED STATES PATENTS

| Number | Name | Date |
|---|---|---|
| 385,851 | Easley | July 10, 1888 |
| 593,548 | Baumgarten et al. | Nov. 9, 1897 |
| 1,215,439 | Wagrer | Feb. 13, 1917 |
| 1,352,894 | Hoffine | Sept. 14, 1920 |
| 1,623,987 | Wahl | Apr. 12, 1927 |
| 1,855,341 | Deleroy | Apr. 26, 1932 |
| 1,874,329 | McElvain | Aug. 30, 1932 |
| 1,933,738 | Kazoian | Nov. 7, 1933 |
| 2,274,306 | Smith | Feb. 24, 1942 |
| 2,274,914 | Wilcox | Mar. 3, 1942 |

FOREIGN PATENTS

| Number | Country | Date |
|---|---|---|
| 557,898 | Germany | Aug. 29, 1932 |